United States Patent [19]
Remeika et al.

[11] 3,865,752
[45] Feb. 11, 1975

[54] CATALYST ACTIVATION PROCESS AND PRODUCT THEREOF

[76] Inventors: Joseph Peter Remeika, Warren Township, Somerset County; Rudolf Johannes H. Voorhoeve, Summit, both of N.J.; Bell Telephone Laboratories, Incorporated, Murray Hill, N.J.

[22] Filed: Dec. 18, 1972

[21] Appl. No.: 316,255

[52] U.S. Cl.................. 252/462, 252/413, 252/467, 252/468, 252/469, 252/471, 252/475
[51] Int. Cl............................................. B01j 11/06
[58] Field of Search ........... 252/462, 413, 467, 468, 252/469, 471, 475

[56] References Cited
UNITED STATES PATENTS

| | | | |
|---|---|---|---|
| 2,867,497 | 1/1959 | Houdry et al. | 252/413 |
| 2,921,018 | 1/1960 | Helmers et al. | 252/413 |
| 3,450,789 | 6/1969 | Kehl et al. | 252/462 |
| 3,595,809 | 7/1971 | Kehl et al. | 252/462 |

OTHER PUBLICATIONS
Voorhoeve et al., Science, Vol. 177, p. 353–354.
Scott, Standard Method of Chemical Analysis, D. Van Nostrand, N.Y., N.Y., 5th ed, (1939), Vol. 1, p. 206–207.

*Primary Examiner*—Arthur P. Demers
*Attorney, Agent, or Firm*—G. S. Indig

[57] ABSTRACT

Catalyst members of the class exemplified by the nominal atom formula $RE_{1-x}Pb_xMnO_3$, in which Pb can be replaced by other divalent cations and Mn can be replaced by other trivalent cations, are activated by acid etching. The procedure is particularly efficacious where preparation is by ceramic firing techniques with activation making such materials comparable in activity to crushed single crystals of the same compositions. Activated catalysts of this class are useful for catalytic conversion of auto exhaust pollutants to non-toxic forms.

5 Claims, 3 Drawing Figures

CATALYST ACTIVATION PROCESS AND PRODUCT THEREOF

BACKGROUND OF THE INVENTION

1. Field of the Invention

The invention is concerned with catalysts and catalysis for promoting oxidation and reduction reactions in fluid media.

2. Description of the Prior Art

Vol. 177, *Science*, p. 353 (1972) reports work on a series of catalysts belonging to the class represented by the nominal atom formula $RE_{1-x}M_xM'O_3$ where RE consists of at least one or more of the elements lanthanum, praseodymium or neodymium, M' is manganese or chromium, and $x$ is from 0.2 to 0.7. As there reported, catalysts of this class compare favorably with other contenders for the treatment of auto exhaust pollutants. In fact, members of this class are found effective for catalysis of reduction reactions, e.g., of $NO_x$ to non-toxic form, $N_2$ and $O_2$, as well as for the catalysis of oxidation reactions such as of CO to $CO_2$. See U.S. application Ser. No. 262,789, filed June 19, 1972 now abandoned.

Much of the work reported in the *Science* article was based on experiments utilizing crushed single crystalline materials grown from flux-nutrient solutions. Companion work utilizing alternative techniques which may be more expedient from a commercial standpoint has been conducted. These include the usual ceramic forming techniques such as sintering, co-precipitation, freeze drying, spray drying, etc. While such procedures have yielded catalysts of significant activity, catalysts so prepared have generally been somewhat less active than crushed single crystals prepared from flux-nutrient solution. Lessened activity has been observed both for oxidation and reduction reactions.

SUMMARY OF THE INVENTION

In accordance with the invention, catalyst members of the nominal class $RE_{1-x}M_xM'O_3$, where RE consists of one or more of the elements lanthanum, praseodymium or neodymium, M' is manganese or chromium, and $x$ is from 0.05 to 0.7 and preferably 0.2 to 0.6 generally, but not necessarily, prepared by ceramic forming techniques, are activated by acid etching. Experimental work has been sufficiently extensive to establish the activation efficacy of any reagent within the pH range of from 0.5 to 6.0. While it has been observed that slight advantage may be gained by particular reagents for particular catalytic compositions, it is uniformly observed that use may be made of any reagent of such properties utilized under such conditions as to result in the removal of at least 1% by weight from the final catalyst to be exposed to the fluid media to be reacted. Exemplary materials are HCl, $HNO_3$, and $CH_3COOH$, any of which may permit activation of the order of a few minutes or greater at easily attainable temperatures.

Activation, in accordance with the invention, is of greatest significance for use on catalytic materials prepared on ceramic forming techniques such as sintering but has a still valuable, albeit appreciably lesser effect, on single crystals grown from nutrient-flux solution.

DETAILED DESCRIPTION

1. The Figures

Figure 1:
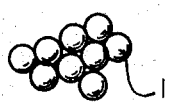
FIG. 1 is a front elevational view of a catalyst in accordance with the invention.

The catalyst shown in FIG. 1 takes the form of a plurality of pellets or particles 1 which may be of uniform composition or may take a supported form with active ingredient being dispersed through or present as a coating on the individual bodies. The physical form depicted in FIG. 2, a detail of which is shown as 2A, considered particularly promising for use in a moving stream of effluent gaseous matter, may take the form of a coating 10 of any of the compositions herein on a substrate 11, which may take the form of alumina, commonly utilized as a catalyst support in industry.

Figure 2A:
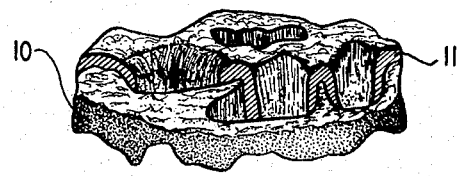
FIG. 2A is an exploded view of a portion of the catalyst of FIG. 2.
Figure 2:
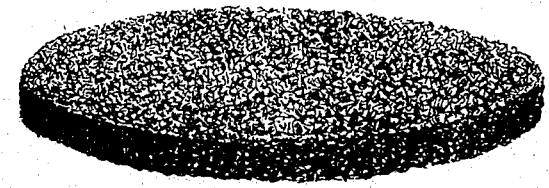
FIG. 2 is a perspective view of a form of supported catalyst.

Activation treatment, in accordance with the invention, is normally carried out on the final catalyst as exemplified by the fluid and fixed beds of FIGS. 1 and 2, respectively. Under certain circumstances, however, activation of particulate matter may be carried out prior to fabrication of a fixed bed structure such as that of FIG. 2.

2. Composition

As indicated, the active ingredient, in accordance with the invention, is necessarily included within the formulation $RE_{1-x}M_xM'O_3$, in which RE is at least one of the rare earth elements lanthanum, praseodymium, or neodymium, in which M is lead, other divalent cation such as calcium, strontium or barium or mixture thereof, in which M' is manganese and/or chromium, and $x$ is 0.05 to 0.7 and preferably from 0.2 to 0.6. Investigations to date reveal the best catalysts of the invention take the form of distorted perovskites. The significance of structural considerations is suggested by the fact that materials resulting from substitution of other $4f$ rare earths which generally yield different structures have not proven to be of comparable activity.

The fact that catalysts are frequently used in supported form in which their compositions are effectively diluted by inert ingredients suggests that the compositional definition is to be considered as directed only to the active catalysts ingredient. Accordingly, any of the cation positions may be occupied by unspecified cations although, desirably, such substitutions have no significant effect on structure. It has also been observed that vacancy structures commonly occur within the compositional ranges set forth. Such vacancies, which have been observed to within a maximum of 15 percent for any given cation site, suggest a deviation from the formula set forth in which any indicated cation may be reduced in amount accordingly.

While any of the three rare earth cations are effectively incorporated and any one may, in fact, be found optimum for some given reaction, experiments to date have indicated a general preference for neodymium. Use of this cation, particularly for catalysis of oxidative reactions, results in a decrease in the ignition temperature by amounts sometimes as great as 40° C compared to the other enumerated rare earth cations.

As indicated, lead appears to be the preferred "M" cation at this time although this preference is based on the hope that its use will result in optimization of resistance to poisoning by lead-containing ingredients as indicated, an advantage already seen relative to platinum.

Experimentally, this preference has not been established and it may be that selection will be based on economic considerations — as for the least expensive element, calcium.

The "M" cation is preferably manganese, although compounds utilizing chromium have been found to yield catalytic activity substantially comparable, at least for oxidation reactions. Use of certain other M' cations is permitted, e.g., Fe, V, but the resulting compounds, while catalytically active, have not proven to be comparable to preferred compounds utilizing manganese or chromium, at least for promoting the oxidation and reduction reactions studied.

It has been indicated that an advantage of compositions of the invention is relatively low cost. It is accordingly quite feasible to utilize catalyst bodies of homogeneous composition containing or made up of compositions within the formulation set forth. In the interest of further cost saving and also of improved heat dissipation, it may be desirable to utilize a supported structure of the type now so familiar in industry. A common support material is aluminum oxide $Al_2O_3$. This, as well as other inert material, is easily prepared in a form having high free-surface area which may then be coated with any of the included compositions.

3. Preparation

It has been indicated that activation, in accordance with the invention, is of primary interest for the treatment of catalysts prepared by ceramic forming techniques. These include sintering of, for example, the corresponding binary oxides or other compounds which yield such oxides, see *Journal of Applied Physics*, Vol. 36, No. 3, pp. 1,165, 1965; co-precipitation from a variety of fluxes (e.g., lead oxide-boron oxide, lead oxide, lead fluoride), see *Materials Research Bulletin*, Vol. 3, pp. 895–900, 1968, etc.

The above is concerned largely with the preparation of the active ingredients. Fabrication of actual catalyst bodies, particularly of the supported variety, may involve a variety of other common procedural steps, e.g., impregnation of porous support bodies as by co-precipitation or other crystallization, or by deposition of metal layers which are then oxidized to form the desired compound.

4. Examples

The following examples, prepared in tabular form, report tests conducted on catalysts of both oxidation and reduction reactions utilizing a variety of etchants all within the above class. In each instance, the catalyst composition was exposed to the described gaseous mixture under the same conditions of flow, temperature, etc. While a variety of experiments were conducted, those reported are in terms of temperature required to attain a stated percent conversion.

TABLE I

| Ex. No. | Catalyst | Preparatory Technique | Reaction | Etchant | Etching Conditions | Percent Conversion | Temperature Etched-Unetched | |
|---|---|---|---|---|---|---|---|---|
| 1 | $La_{.7}Pb_{.3}MnO_3$ | Flux growth | $CO \rightarrow CO_2$ | ag.$HNO_3$(20%) | 10 min 100°C | 15% | 185°C | 220°C |
| 2 | $La_{.7}Pb_{.3}MnO_3$ | Flux growth | $CO \rightarrow CO_2$ | ag.HCl(20%) | 5 min 93°C | 15% | 150°C | 220°C |
| 3 | $La_{.7}Pb_{.3}MnO_3$ | Flux growth | $CO \rightarrow CO_2$ | ag.$CH_3COOH$(20%) | 5 min 102°C | 15% | 200°C | 220°C |
| 4 | $La_{.7}Pb_{.3}MnO_3$ | Flux growth | $CO \rightarrow CO_2$ | ag.$HNO_3$(11%) | 10 min 80°C | 10% | 205°C | 240°C |
| 5 | $La_{0.5}Pb_{0.5}MnO_3$ | Oxide Sintering | $CO \rightarrow CO_2$ | ag.$HNO_3$(5%) | 5 min 65°C | 10% | 180°C | 260°C |
| 6 | $La_{0.7}Sr_{0.3}MnO_3$ | Oxide Sintering | $CO \rightarrow CO_2$ | ag.$HNO_3$(5%) | 5 min 65°C | 10% | 135°C | 180°C |
| 7 | $La_{0.7}Ca_{0.3}CrO_3$ | Oxide Sintering | $CO \rightarrow CO_2$ | ag.$HNO_3$(20%) | 5 min 95°C | 10% | 325°C | 400°C |
| 8 | $Nd_{.7}Pb_{.3}MnO_3$ | Flux growth | $CO \rightarrow CO_2$ | ag.$HNO_3$(20%) | 5 min 105°C | 10% | 160°C | 175°C |
| 9 | $Pr_{.7}Pb_{.3}MnO_3$ | Flux growth | $CO \rightarrow CO_2$ | ag.$HNO_3$(20%) | 5 min 105°C | 10% | 185°C | 220°C |
| 10 | $La_{0.5}Pb_{0.5}MnO_3$ | Oxide Sintering | $NO \rightarrow N_2$ | ag.$HNO_3$(5%) | 5 min 65°C | 20% | 250°C | 320°C |
| 11 | $La_{0.7}Sr_{0.3}MnO_3$ | Oxide Sintering | $NO \rightarrow N_2$etc | ag.$HNO_3$(5%) | 5 min 65°C | 100% | 330°C | 450°C |
| 12 | $La_{0.5}Pb_{0.5}MnO_3$ | Oxide Sintering | $NO \rightarrow N_2$etc | ag.$HNO_3$(5%) | 5 min 65°C | 100% | 250°C | 300°C |
| 13 | $La_{0.5}Ca_{0.5}MnO_3$ | Oxide Sintering | $NO \rightarrow N_2$etc | ag.$HNO_3$(5%) | 5 min 65°C | 100% | 300°C | 420°C |

5. Physical Form

Catalysts of the invention, in common with those generally utilized for promoting fluid reaction are surface-active. Accordingly, particularly where the catalyst composition is homogeneous and consists primarily or exclusively of active ingredients in accordance with the invention, it is desirable that the free surface area be maximized. This may be accomplished by ball milling or otherwise reducing to small particle size, or by preparation of porous bodies as by freeze drying or, indeed, by any of the techniques set forth under "Processing" above. Such homogeneous compositions desirably manifest a free surface to weight ratio of the order of at least one-half sq. meter per gram. Measurement of this parameter is conveniently made by standard nitrogen or krypton adsorption level [*Journal of Amer. Chemical Soc.* Vol. 60, p. 309 (1938)]. Supported forms of catalyst, in accordance with the invention, may not manifest such surface to weight ratios of active ingredient although an attempt is usually made to maximize available free surface as, for example, by use of porous or particulate substrates.

6. Reactions

Concern thus far has largely been with promoting the reaction of harmful ingredients in the effluent contained, for example, in the exhaust gas produced by combustion engines. In common with prior art catalysts of interest for such use, materials of the invention are promising also, both as positive and negative catalysts for use in a variety of reactions. For example, tests made on the hydrogenation of iso-butene to butane showed that materials of the invention are at least comparable, and often superior, to $LaCoO_3$ in catalyzing this conversion.

7. Postulated Mechanism

While improved activity invariably results upon removal by solution of 1% or more of the mass of the catalytic material regardless of composition and regardless of reagents used, it is observed that activation is of far greater magnitude as practiced on catalyst materials prepared by ceramic forming techniques, e.g., sintering, coprecipitation, etc. It is also observed that activated materials effectively catalyze $NO_x$ reduction at lowered temperature at which relatively less $NH_3$ may be expected to form. X-ray studies have indicated materials formed by ceramic techniques frequently include discernible amounts of partially reacted binary compounds. It has been determined that some such binary compounds, unlike ternary compounds of the preferred catalyst class, may result in significant $NH_3$ and $NH_4CO_3$ formation at lower temperatures, e.g., 200°–400° C. It has also been determined that some binary compounds, e.g., $La_2O_3$ and $PbO$ are more soluble in acid etchants within the pH range used for activation than are the fully reacted ternary materials. There is, therefore, some basis for postulating that preferential removal of incompletely reacted material from the catalyst surface will, for some materials, result in lower $NH_3$ production in the reduction of $NO_x$.

The fact that activation has some effect, although generally smaller, on completely reacted single crystal materials verified that the activation mechanism is not restricted to binary removal. Relative activation magnitudes for crushed single crystals relative to materials prepared by sintering of oxides are apparent from the examples.

It is apparent that different preparation conditions, particularly those designed to assure more complete reaction, may somewhat lessen the magnitude of the activation effect in accordance with the invention. The desire to prepare large surface area materials, generally resulting from conditions which do not insure complete firing, may, to some extent, be inconsistent with this approach.

8. General Activation Procedure

It has been indicated that the inventive procedure requires removal of approximately 1% of the mass of the active catalyst. Most reagents utilized in accordance with the invention are liquid, although gaseous agents may be utilized. The sole requirement for removal is intimate contact between etchant and catalyst, and this may be brought about in any conventional manner. A suitable laboratory procedure is to immerse 10.0 gms. of the catalyst material in a solution of 100 ml. $HNO_3$ and 400 ml. $H_2O$ at a temperature of about 90° C. This temperature is maintained with stirring for a period of 5 minutes. The catalyst material is allowed to settle and the acid solution is poured off. The catalyst material is then washed with three changes of hot distilled $H_2O$. The catalyst may then be air dried, or a final rinse with acetone may be used to hasten the drying process.

It is apparent that the activation techniques of the invention, while certainly valuable in the initial preparation of the catalysts of the noted class, may also serve a useful function in regeneration. Of particular interest is the fact that elemental lead and lead compounds such as lead oxides and lead oxyhalides contained in exhaust flowing from engines utilizing tetra-alkyl lead anti-knock agents are quite soluble in the acid media utilized in accordance with the invention. This is in marked contrast to platinum-based catalysts in which alloys resulting from chemical poisoning by lead are substantially insoluble to any feasible reagent.

What is claimed is:

1. Activation procedure for increasing the catalytic activity of an unused catalyst containing an active ingredient which consists essentially of at least one composition within the atom formula $RE_{1-x}M_xM'O_3$, in which the amount of any of the three indicated cations may be reduced by up to about 15 atom percent to accommodate vacancy structures, in which RE is at least one element selected from the group consisting of La, Pr, and Nd, in which M is at least one element selected from the group consisting of Pb, Ca, Sr, and Ba, in which M' is at least one element selected from the group consisting of Mn and Cr, and in which $x$ is from 0.05 to 0.7, characterized in that such active ingredient is intimately contacted by a fluid within the pH range of from 0.5 to 6.0 for a time and at a temperature sufficient to remove at least 1% of the active ingredient.

2. Activation procedure of claim 1 in which the said fluid consists essentially of an aqueous solution of a compound selected from the group consisting of HCl, $HNO_3$, and $CH_3COOH$.

3. Activation procedure of claim 1 in which the said active ingredient is prepared by a ceramic forming technique.

4. Activation procedure of claim 3 in which the forming technique includes a sintering step.

5. Activation procedure of claim 4 in which the catalyst to be contacted by the said fluid contains binary compounds of any pair of the elements included within the said formula as discernible by X-ray analysis.

* * * * *

UNITED STATES PATENT OFFICE
CERTIFICATE OF CORRECTION

PATENT NO. : 3,865,752
DATED : February 11, 1975
INVENTOR(S) : Joseph P. Remeika - Rudolf J. H. Voorhoeve It is certified that error appears in the above-identified patent and that said Letters Patent are hereby corrected as shown below:

Column 1, line 22, "262,789" should read --263,789--.

Signed and Sealed this fifth Day of August 1975

[SEAL]

Attest:

RUTH C. MASON
Attesting Officer

C. MARSHALL DANN
Commissioner of Patents and Trademarks